United States Patent Office 3,493,328
Patented Feb. 3, 1970

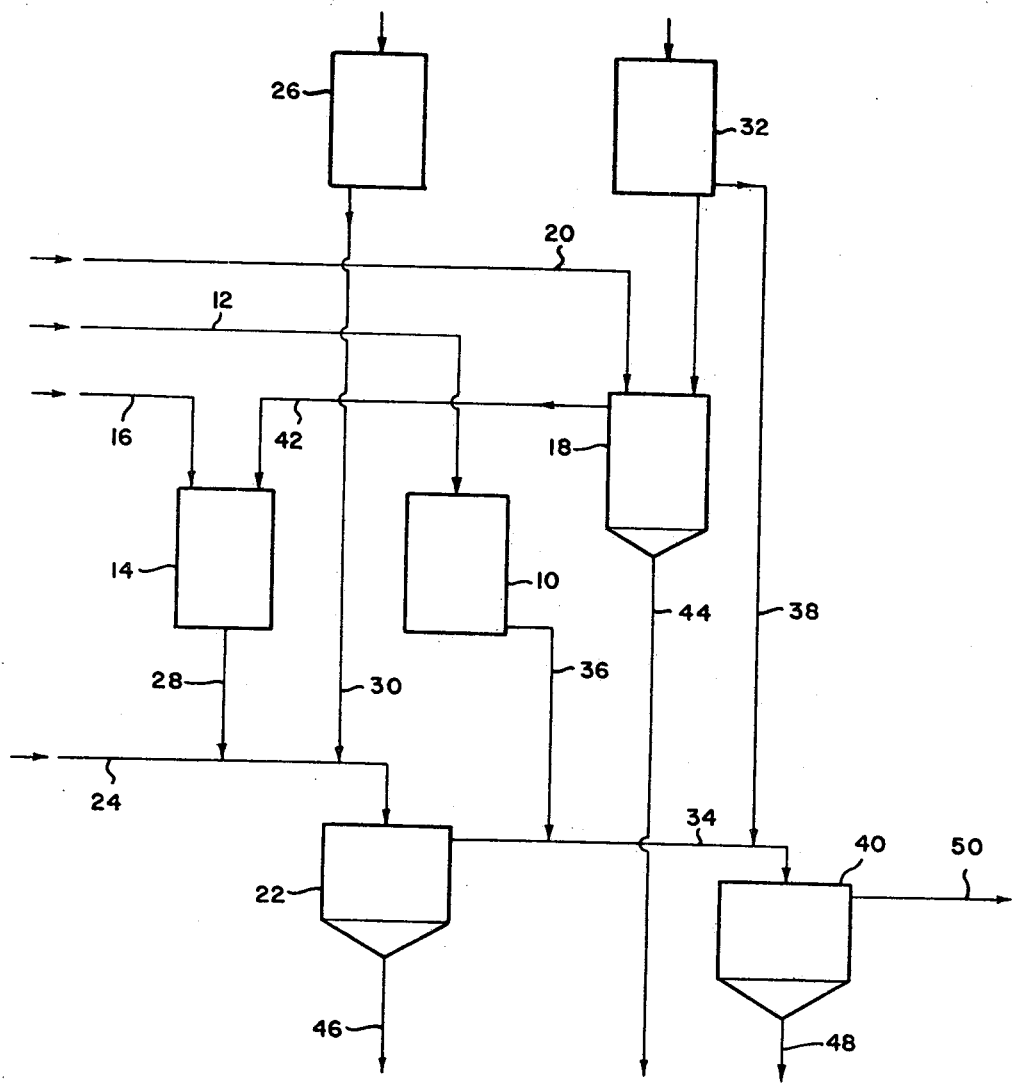

3,493,328
PROCESS FOR REMOVING HEXAVALENT CHROMIUM FROM INDUSTRIAL METAL TREATING WASTES AND RINSE WATERS
Garmt J. Nieuwenhuis, 2015 42nd Ave. E., Seattle, Wash. 98102
Filed Sept. 8, 1966, Ser. No. 577,876
Int. Cl. C01g 37/14
U.S. Cl. 23—56                                    8 Claims

ABSTRACT OF THE DISCLOSURE

Hexavalent chromium contained in aqueous metal treating wastes is substantially completely removed from the aqueous solution by metering the acid wastes into rinse water, metering stoichiometric amounts of a lead compound such as lead nitrate into the rinse water containing the hexavalent chromium to form a insoluble lead chromate precipitate and an aqueous precipitate residue which is subsequently treated with a caustic cleaning solution to neutralize the acids and precipitate the remaining metals and metal compounds in the aqueous treating solution. The residual aqueous solution is suitable for reuse.

---

This invention relates to processes for treating industrial wastes and more particularly for treating metal solutions to remove hexavalent chromium and other toxic chemicals.

Chromium-containing metal treating solutions are used in a number of industries to increase corrosion resistance. These solutions are acid solutions having various compositions depending upon the metal to be treated. Hexavalent chromium in some form—such as sodium dichromate, sodium chromate, potassium dichromate, potassium chromate, chromium tri-oxide (chromic acid) and the like—is present in these solutions. Because hexavalent chromium is one of the most toxic chemicals to fish life in even very minute concentrations on the order of one part per ten million, it must be substantially completely removed before treating solution waste waters are discharged in a sewage system. Other metals and metal compounds usually considered toxic found in such treating solutions can be precipitated out by suitably adjusting the pH of the waste waters. Hexavalent chromium, however is soluble at a pH of 0–14 and therefore special methods must be employed to remove it.

The most well known and most commonly used method is to reduce chromium from a hexavalent form to a trivalent form with $SO_2$ and then adjust the pH with calcium hydroxide to precipitate out the trivalent chromium together with relatively large quantities of calcium sulfate (gypsum) sludge. This method suffers from two serious deficiencies: (1) the gypsum has little commercial utility, and (2) the amount of trivalent chromium is usually too small and too contaminated by the gypsum to be of any commercial value. A further disadvantage of the $SO_2$ method is that no free water is obtained that can be recycled for reuse in the metal treating system. Other methods of reducing hexavalent chromium employ sugar, wood, molasses and sawdust and are likewise unsatisfactory because of the production of large amounts of sludge having little or no commercial utility.

A primary object of this invention is to provide a process for removing hexavalent chromium from metal plating solution waste waters in a commercially useable form and to also remove other toxic metals with the production of a minimum amount of un-useable by-products such as gypsum. Another object is to provide such a process wherein clear water is obtained that can be reused in the metal treating system thereby permitting the use of a substantially closed water system.

In brief, the invention comprises treating acid wastes from metal treating baths, containing hexavalent chromium in some form, with stoichiometric amounts of a lead compound suitable to form relatively insoluble lead chromate with hexavalent chromium. Lead chromate is sufficiently insoluble that the very low tolerance requirements for $Cr^{(+6)}$ set by pollution authorities can be met. Once the lead chromate has formed and precipitated, the pH of the remaining acid wastes can be adjusted to cause the remaining metals to precipitate and to neutralize the acids leaving clear water for disposal or reuse. Exemplary soluble lead compounds are soluble lead salts such as lead nitrate and lead acetate. The desired degree of solubility of the lead salts is governed by economics, i.e. the time period within which the compound must be dissolved and the amount of the compound available to yield sufficient lead cation. Exemplary insoluble lead compounds include lead oxides such as $PbO_2$ and $Pb_3O_4$ and lead hydroxide.

The treating process of this invention can be either a batch process or a continuous process, depending, inter alia, on the quantity of acid waste to be processed and the availability of the acid waste. In a batch process, the acid wastes containing hexavalent chromium could be placed in a settling tank; the stoichiometric amount of the lead compound added to remove all of the hexavalent chromium by forming therewith a chromate precipitate; the chromate precipitate withdrawn; the pH adjusted to cause the remaining metals to precipitate and to neutralize the acids; and then these precipitates withdrawn to leave clear water. In a continuous process, a solution of chromate-forming material could be metered into an acid waste stream in proper proportion to combine with the hexavalent chromium to precipitate the chromate, the stream containing the chromate-forming material passed to a first settling tank for withdrawal of the chromate precipitate, the remaining solution passed from the first settling tank with the addition of a basic solution to raise the pH to precipitate the remaining metals and to neutralize the acids, the neutralized solution passed to a second settling tank for withdrawal of these metals, and the remaining clear water withdrawn from the second settling tank.

In both the batch and continuous methods of operating this invention, the pH of the acid wastes must be maintained sufficiently low that no metal will precipitate until the hexavalent chromium is precipitated. Usually, trivalent chromium will be present in acid wastes from metal treating solutions and will precipitate at a pH of 5.3 or higher, a pH value at which most other metals will not remain in solution. Thus, in most processes employing this invention, the pH of the acid wastes must be initially maintained below 5.3 until the hexavalent chromium is withdrawn. Of course, if metals are present in the acid wastes which would precipitate at a lower pH value than 5.3, the pH of the acid wastes must be maintained below that lower value.

When using lead oxide or lead hydroxide compounds, the trivalent chromium will be oxidized to hexavlent chromium and then precipitated along with the previously-existing hexavalent chromium as lead chromate thereby increasing the yield of lead chromate. Lead oxides and hydroxides are almost completely insoluble in water and if too much is added to the waste waters, the excess will precipitate rather than remain in solution.

The figure schematically depicts a preferred continuous process using lead nitrate in accordance with this invention within a metal treating system. In the metal treating system, the metal products are first subjected to a caustic cleaner to clean the surface metal, secondly dipped in one or more chrome treating solutions to obtain a rust inhibiting surface, and then rinsed in the dipping solution. The caustic cleaner is passed to a holding vessel 10 in line 12. The chromic-sulfuric acid wastes of the dipping solution are passed to a holding vessel 18 in line 20 for a reason that is explained hereinafter. Metal treating solutions are passed to vessel 14 in line 16. The rinse waters are passed to a first settling vessel, or clarifier, 22 in line 24. To briefly complete the description of the figure, the contents of holding vessel 14 and lead nitrate solution from vessel 26, are metered into rinse water line 24, in lines 28 and 30, respectively, line 28 being upstream of line 30 with respect to settling vessel 22. The contents of vessel 10, and any requied amount of calcium hydroxide from vessel 32, are metered into the effluent line 34 leading from the first settling vessel 22 to the second settling vessel 40 in lines 36 and 38, respectively, line 36 being upstream of line 38, with respect to the second settling vessel, or clarifier 40. Calcium hydroxide from holding vessel 32 is metered into holding vessel 18 and any hexavalent chromium in vessel 32 is passed to holding vessel 14 in line 42. The precipitate residues from vessels 18, 22 and 40 are drawn off in lines 44, 46 and 48, respectively. Clear water is drawn from the process from the second settling vessel 40 in line 50 for disposal or for reuse in the metal treating system.

The lead chromate product recovered in the process depicted in the figure should preferably precipitate as relatively fine particles. If the particles are too large, they must be ground into smaller particles after recovery before they are useful as pigment. It has been found that lead chromate particle size can be controlled by controlling the concentration of hexavalent chromium entering settling vessel 22, with smaller concentrations yielding smaller particle sizes. The concentration of lead and chromate reactants for this particular process should not exceed about 0.05 molar to yield a particle size that meets pigment industry specifications for a first grade lead chromate pigment. Of course if larger sized particles can be tolerated, an increase in the molarity of the lead solution is acceptable. The lead nitrate is metered into line 24 downstream of the input from vessel 14 in the proper amount to combine all of the hexavalent chromium into lead chromate with no excess of lead. Of course, a suitable rinsing and feed back control system would monitor the solution in settling vessel 22 to insure that there is no remaining hexavalent chromium or lead present to pass into the second settling vessel 40.

The caustic cleaner is metered into line 34 to adjust the pH of the solution passing into settling vessel 40 to 7.0 to neutralize the solution and precipitate the metals leaving ionized water. This ionized water contains primarily sodium and calcium ions and is suitable for cleaning and other purposes. If deionized, the water can also be used as rinse or process water. Should the alkali content of the caustic cleaner be insufficient to neutralize the solution from settling tank 22 without use of undue quantities, calcium hydroxide from vessel 32 can be added to adjust the pH to 7.0.

As mentioned above, if any chrome-containing sulfuric acid is present, such acid wastes are passed to vessel 18 wherein sufficient calcium hydroxide is added to precipitate gypsum and all toxic metals except hexavalent chromium. This precipitate is useless because of the concentration of gypsum. If trivalent chromium is present in sufficient quantities sodium hydroxide can be used instead of calcium hydroxide to recover trivalent chromium. The remaining hexavalent chromium is passed in line 42 to vessel 14 for processing in the manner described above. If chrome-containing sulfuric acid wastes were not processed in this manner but rather combined with the other acid wastes, two undesirable results would occur. First, when lead nitrate is added, both lead chromate and lead sulfate would precipitate thereby producing a composite pigment having little or no commercial utility. Second, when basic solution is added, the formation of gypsum would eliminate the opportunity to recover desirable metals such as trivalent chromium from the residue in settling vessel 40. In the process depicted in the figure, if trivalent chromium is present in such residue in sufficient concentration, it can be economically recovered whereas it could never be economically recovered from gypsum.

It is believed that the invention will have been clearly understood from the foregoing detailed description of my now-preferred illustrated embodiment. Changes in the details of construction may be resorted to without departing from the spirit of the invention. For example, $PbO_2$, $Pb_3O_4$ or PbOH could be substituted for lead nitrate in above-described continuous process. It is accordingly my intention that no limitations be implied and that the hereto annexed claims be given the broadest interpretation to which the employed language fairly admits.

The embodiments of the invention in which an exclusive property or privilege is claimed are defined as follows:

1. A process of treating aqueous hexavalent chromium containing acid waste solutions comprising:
   maintaining the pH of the acid solution sufficiently low that no metal compounds will precipitate until the chromate precipitate is formed and removed;
   treating said acid solution with stoichiometric amounts of a lead compound selected from the group consisting of lead nitrate, lead acetate, lead hydroxide and lead oxide to form an insoluble lead chromate precipitate and an aqueous residue;
   withdrawing the lead chromate precipitate;
   adding a basic solution selected from the group consisting of alkali metal and alkaline earth metal hydroxides, or mixtures thereof to the aqueous residue to neutralize the remaining acids therein, form a precipitate of remaining metal compounds in the solution and form an ionized aqueous residue and separating said precipitate from aqueous residue.

2. The process of claim 1 wherein the pH is maintained below 5.3.

3. The process of claim 1 wherein the amount of basic solution added to the aqueous residue is sufficient to raise the pH of the solution to at least 7.0.

4. The process according to claim 1 wherein the concentration of the chromium compound and lead compound in the aqueous acid solution at the time of treatment of the chromium containing solution with the lead compound does not exceed 0.05 molar concentration.

5. A process for treating aqueous acid solutions containing hexavalent chromium obtained from a process wherein metal members are washed in a caustic cleaning solution, dipped in an aqueous acid solution containing hexavalent chromium and rinsed in a chrome-sulfuric acid dipping solution, comprising:
   collecting the caustic cleaning solution;
   collecting the acid solution containing hexavalent chromium wastes;
   collecting the chrome-sulfuric acid solution;
   treating the chrome-containing sulfuric acid solution with sufficient calcium hydroxide to form a calcium sulfate precipitate and an aqueous residue containing hexavalent chromium;
   adding the residue containing hexavalent chromium to the aqueous acid solution containing hexavalent chromium;
   maintaiing the pH of the aqueous acid solution containing hexavalent chromium sufficiently low that no metal compound will precipitate until a chromate precipitate is formed and removed;
   treating the aqueous acid solution containing hexavalent chromium with a lead compound selected from the group consisting of lead nitrate, lead acetate, lead oxide and lead hydroxide to form an insoluble lead chromate precipitate and an aqueous residue containing residual metal compounds;
withdrawing the lead chromate precipitate;
adding a basic solution selected from the group consisting of alkali metal and alkaline earth metal hydroxides or mixtures thereof to the aqueous residue to neutralize the remaining acids, form a precipitate of the remaining metal compounds, and form an ionized aqueous solution and separating said precipitate from the aqueous solution.

6. The process of claim 5 wherein the pH is maintained below 5.3.

7. The process of claim 5 wherein the amount of basic solution added to the aqueous residue is sufficient to raise the pH of the solution to at least 7.0.

8. The process of claim 5 wherein the concentration of chromate and lead reactants is maintained less than 0.05 molar.

References Cited

UNITED STATES PATENTS

| | | | |
|---|---|---|---|
| 620,935 | 3/1899 | Krebs | 23—56 |
| 1,201,392 | 10/1916 | Tucker | 23—56 |
| 1,700,657 | 1/1929 | Treusch | 23—56 X |
| 3,325,401 | 6/1967 | Lancy | 23—56 X |
| 3,294,680 | 12/1966 | Lancy | 23—56 X |

HERBERT T. CARTER, Primary Examiner

U.S. Cl. X.R.

210—42, 45